US007155298B2

(12) United States Patent
Rutkowski

(10) Patent No.: US 7,155,298 B2
(45) Date of Patent: Dec. 26, 2006

(54) DEVICE AND METHOD FOR GENERATING AND/OR EDITING NC PROGRAMS OR NC TABLES

(75) Inventor: Christian Rutkowski, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 735 days.

(21) Appl. No.: 10/305,461

(22) Filed: Nov. 25, 2002

(65) Prior Publication Data

US 2003/0114953 A1 Jun. 19, 2003

(30) Foreign Application Priority Data

Nov. 23, 2001 (DE) ................................ 101 47 477

(51) Int. Cl.
 *G05B 19/42* (2006.01)
 *G06F 19/00* (2006.01)
 *G05B 19/04* (2006.01)
(52) U.S. Cl. ............................ 700/87; 700/18; 700/86; 700/181; 700/253; 717/110; 717/113; 717/114; 318/565; 318/567; 318/569; 318/590
(58) Field of Classification Search ............ 700/17–18, 700/83–89, 159, 160, 169, 180, 181, 246, 700/247, 253, 264; 717/110, 113–114, 115; 318/567, 565, 590, 569; 901/3–5
See application file for complete search history.

(56) References Cited

U.S. PATENT DOCUMENTS

| | | | | |
|---|---|---|---|---|
| 4,150,427 A | * | 4/1979 | Slawson ..................... 700/180 |
| 4,607,327 A | * | 8/1986 | Kishi et al. .................... 700/86 |
| 4,703,441 A | * | 10/1987 | Kishi et al. .................. 345/530 |
| 5,115,400 A | * | 5/1992 | Watanabe et al. ........... 700/182 |
| 5,297,023 A | * | 3/1994 | Seki et al. ..................... 700/87 |
| 5,315,523 A | * | 5/1994 | Fujita et al. ................. 700/180 |
| 5,465,215 A | | 11/1995 | Strickland et al. |
| 5,674,106 A | | 10/1997 | Cheetham |
| 5,689,415 A | | 11/1997 | Calotychos et al. |
| 5,746,644 A | | 5/1998 | Cheetham |
| 6,075,335 A | * | 6/2000 | Momochi et al. ........... 318/571 |
| 6,167,325 A | * | 12/2000 | Kamiguchi et al. ......... 700/183 |
| 6,292,715 B1 | * | 9/2001 | Rongo ......................... 700/249 |
| 6,442,444 B1 | * | 8/2002 | Matsubara et al. ........... 700/95 |
| 2003/0088329 A1 | * | 5/2003 | Rutkowski ................... 700/95 |

FOREIGN PATENT DOCUMENTS

| EP | 0 553 433 A2 | 8/1993 |
|---|---|---|
| EP | 0 553 433 B1 | 6/1998 |
| GB | 2 229 418 | 10/1996 |

* cited by examiner

*Primary Examiner*—Ramesh Patel
(74) *Attorney, Agent, or Firm*—Kenyon & Kenyon LLP

(57) ABSTRACT

In a device and a method for generating and/or editing NC programs, where in a programming mode, input fields for machining data and selection lists belonging to the input fields and including permissible machining data are displayed on a display unit. In a configuration mode, the contents of a selection list for an input field is configured via an assigned configuration datum, the configuration datum including at least one executable selection instruction. In the programming mode, the selection instruction is executed such that the result is the selection list is filled with the selected data, and the configured selection list is displayed on the display unit, in that, via the selection instruction, a selective access is made to at least one database having available machining data.

13 Claims, 3 Drawing Sheets

DEVICE AND METHOD FOR GENERATING AND/OR EDITING NC PROGRAMS OR NC TABLES

CROSS-REFERENCE TO RELATED APPLICATIONS

The present application claims priority to Application No. 101 57 577.7, filed in the Federal Republic of Germany on Nov. 23, 2001, which is expressly incorporated herein in its entirety by reference thereto.

FIELD OF THE INVENTION

The present invention is directed to a device, as well as to a method for generating and/or editing NC programs or NC tables.

BACKGROUND INFORMATION

In present day machine tools, numerical controls are used to machine workpieces using an NC program. These NC programs are processed by a numerical control, which controls the machine tool and initiates necessary machining steps. These steps can include, for instance, choosing the tool, guiding the workpiece on a tool path, or introducing and removing cooling agents. As machine tools become more and more efficient, NC programs are keeping pace with this development. For that reason, generating or editing an NC program constitutes an important step in the machining of workpieces using numerically controlled machine tools, and one that is requiring more financial expense. Therefore, it may be important to support the developer of such an NC program in the best manner possible, so that he or she will be able to solve large and complex programming tasks efficiently and accurately. A support of this kind is not only helpful when actually creating the NC programs, but also for other preparatory measures for setting up the NC program, such as in the automatic fitting of the tool magazine, setting up a workpiece, calibrating a tool, etc.

European Published Patent Application No. 0 553 433 relates to a device, as well as a method for supporting the programmer, who, with the aid of an automatic programming system, generates an NC program. During the program creation, at appropriate points in the programming, predefined selection lists including corresponding data records for useful and/or permissible entries are presented, from which merely the desired input still needs to be selected. Selection lists, for example, may present potential problems, however when the selection lists do not offer the selection of tools that are usable at this point in the NC program.

Depending on the machining or machine type, various selection lists are required at different points of the program creation and/or in the programming mode. How to flexibly adapt such selection lists or input aids to various machining and machine conditions cannot be inferred from European Published Patent Application No. 0 553 433.

SUMMARY

An object of the present invention is to provide a device, as well as a method which will enable supportive input aids to be flexibly adapted to greatly varying conditions in the context of NC program creation and similar preparatory measures used in NC program creation.

The above and other beneficial objects of the present invention are achieved by providing a device and method as described herein.

The present invention provides, in a configuration mode, with the aid of a configuration datum, for the contents of a selection list to be configured for the particular input field, the configuration datum including a selection instruction that is executable in the programming mode. In programming mode, the selection instruction is executed, and the selection list is filled with the selected data and displayed. For this, a selective access to at least one database containing available machining data is performed via the selection instruction.

In this manner, selection lists for various input fields and various databases may be flexibly configured by the particular machine manufacturer for different input fields. Besides configuration of the contents, a further configuration of the display of the selection list for the programming mode may be performed.

The configuration datum may contain a plurality of selection instructions which may be alternatively used to determine the data to be displayed. For example, different selection instructions may be assigned to such different tool types, so that on the display unit, following selection of a specific tool type, merely the data assigned to the particular tool type are then displayed.

In addition, in each configuration datum, for each selection instruction, a reference to an input arrangement may be stored, for example, a selectable menu option, a soft key, etc. Upon activation, in the programming mode, the corresponding query is executed via the selection instruction, and the corresponding selected data are displayed on the display unit.

In addition, to flexibly adapt the selection list, the configuration datum may additionally include at least one executable display instruction, for example a text template, with whose assistance the display of the selected data is suitably configured on the display unit in the programming mode.

As a general principle, in the manner according to the present invention, selection lists, which differ greatly with respect to contents and display, are able to be configured on the display unit and are offered during the course of the NC program generation or NC table generation to the programmer for a wide range of input fields. The present invention also enables selection lists or input aids to be made available, not only during the actual NC program generation, but also in the context of further preparatory measures for NC program generation. As described, input aids may be flexibly configured in the form of selection lists, such as in the equipping of the tool magazine, setting up a workpiece, calibrating a tool, etc.

DETAILED DESCRIPTION

Figure 1:
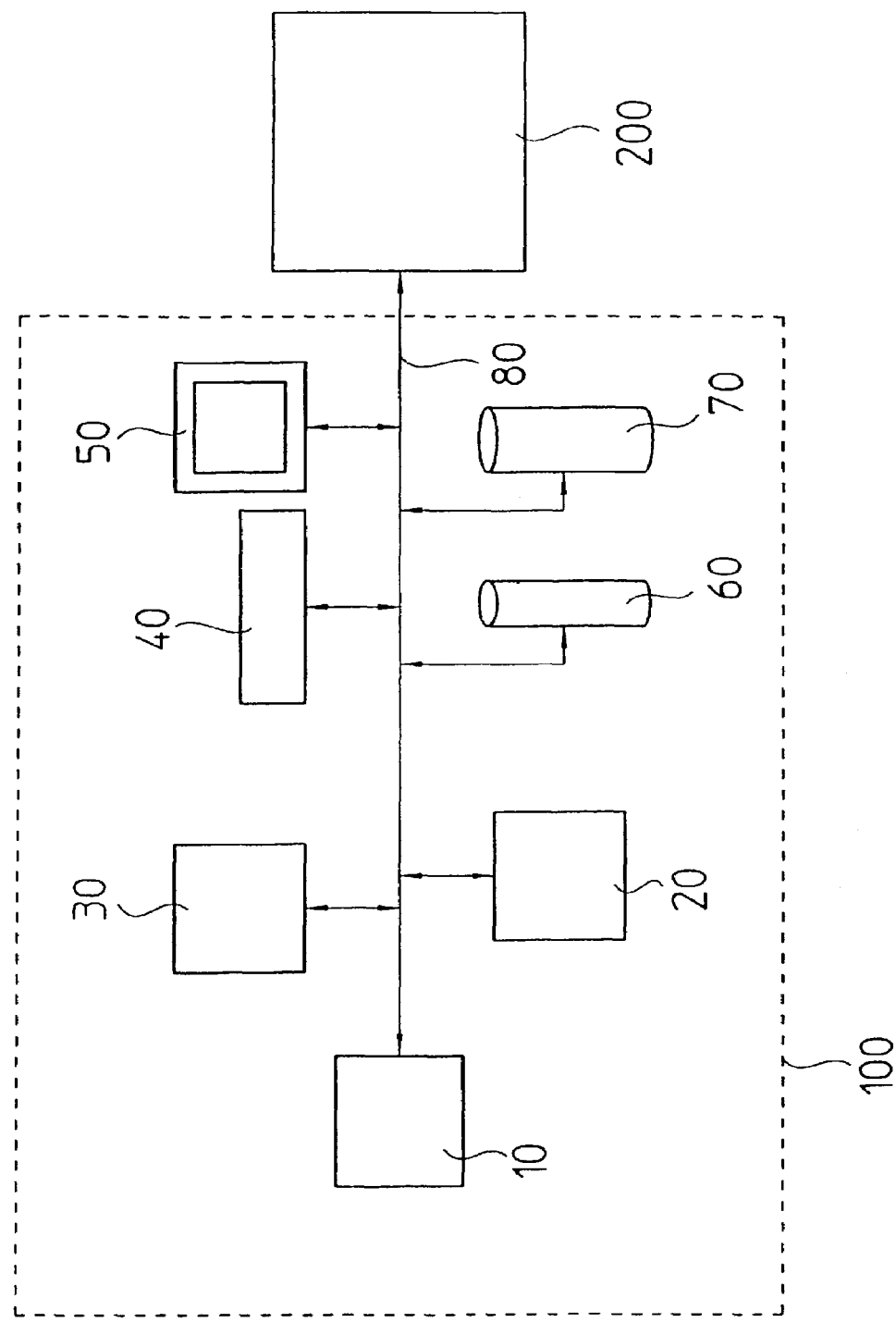
FIG. 1 is a schematized block diagram which explains a typical application of the device according to the present invention.

In schematized form, FIG. 1 illustrates an exemplary embodiment for an application of the device according to the present invention. Numerical machine tool control 100 is used in this case to control the machining of workpieces on a machine tool 200. Numerical machine tool control 100 includes a series of functionally relevant components, which are merely schematically indicated in FIG. 1. Via a bus connection 80, a processor unit 10 is connected to an NC program storage unit 20, a main memory store 30, an input unit 40, a display unit 50, as well as to a plurality of databases 60, 70 on the side of numerical machine tool control 100.

An NC program is generated for the tool machining using machine tool 200 by the programmer in a programming mode, in which specific, supportive input aids are offered to the programmer on display unit 50. This includes, for instance, that for specific input fields, into which requisite machining data must be entered for the NC program to be generated, selection lists including machining data that are permissible at this point, are displayed or offered. This is illustrated in FIG. 2, for example, which illustrates a view of display unit 50 in programming mode.

Figure 2:
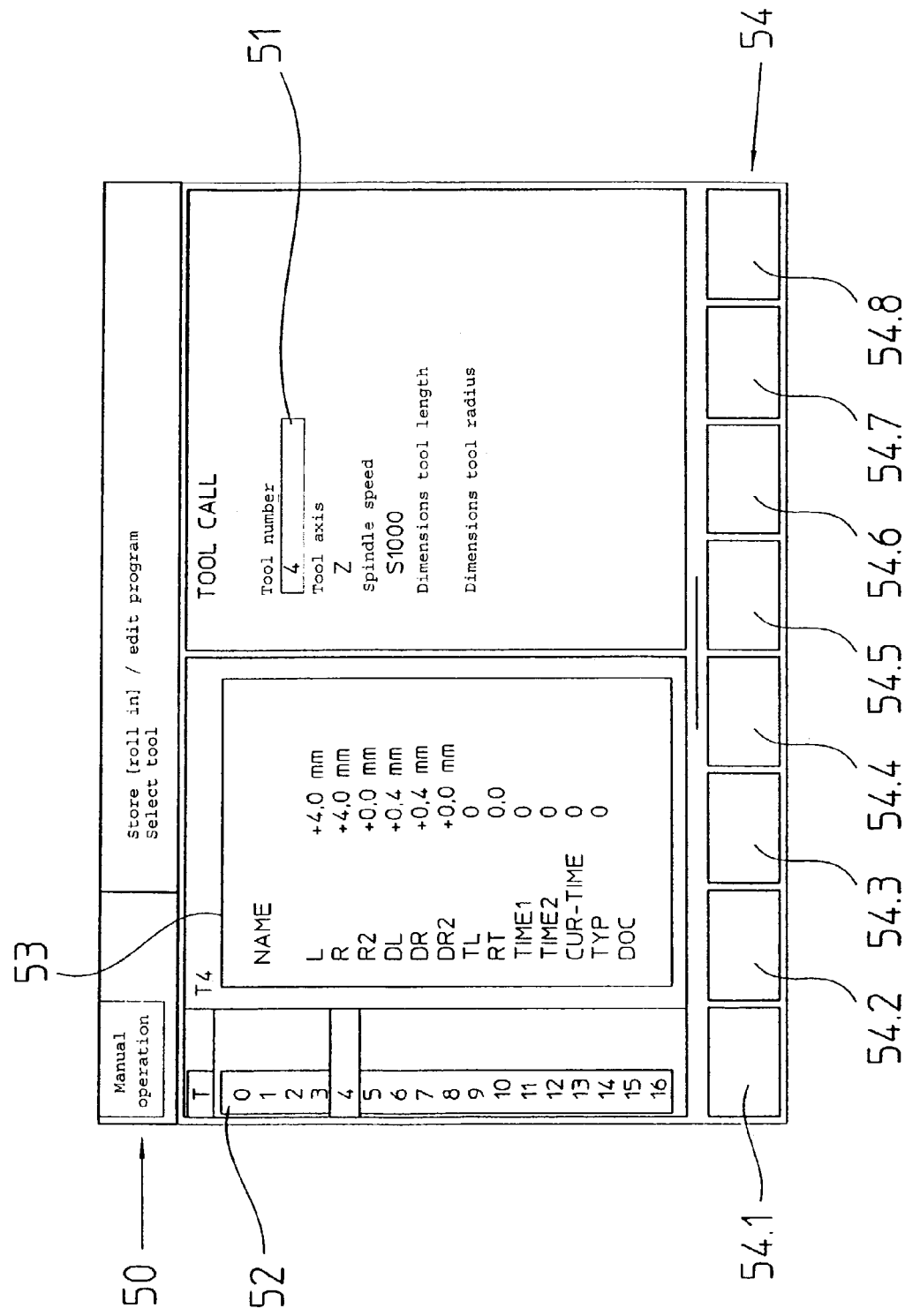
FIG. 2 is a first representation on a display unit in programming mode.

FIG. 2 illustrates an active input field 51, in the right half of the screen of display unit 50, via which a suitable tool is to be selected during the course of the NC program generation. For this, a specific tool number is to be indicated in this input field 51. In the left part of display unit 50, a portion of a selection list is depicted in a selection window 52 which includes the selection of available tools available at this point of the NC program. Selection window 52 of the selection list illustrated in this section of display unit 50 only includes here the numbers of the available tools, thus, for example, T4, T5, etc., and its primary purpose is for the programmer to select a desired tool.

Included at this point in the predefined selection list are also supplemental or descriptive data pertaining to the various tools that are available. The descriptive data associated with the various tools are displayed on display unit 50 in the present example, in a descriptive window 53. Via the descriptive data, further information on the various tools in the selection list is offered to the NC programmer. In the described example, the displayed descriptive data in descriptive window 53 constitute a series of various technology data pertaining to the individual tools, which are visually represented to support the programmer at this point. In this connection, it may be ensured that, in displayed descriptive window 53, only the descriptive data for the currently marked tool are displayed, i.e., in the present example, descriptive data 53 for tool T4, etc.

In selection window 52 having sixteen available or permissible tools on the selection list, with the aid of the input unit, the programmer chooses the desired tool and subsequently continues the NC program generation. An appropriate tool may be selected from selection window 52, for instance, using the cursor keys and the input key of the input unit which is designed as a computer keyboard, etc.

In addition, in the illustrated exemplary embodiment, it is possible, from the various permissible tools on the selection list, to use soft keys 54 to modify the selection of displayed tools without having to change the view. Thus, for instance, a soft key 54.1 may be provided and, in response to an actuation, selection window 52 is limited to the view of available tools for the input field active at the moment to drilling tools. Further soft keys 54.2–54.7, for example, are used to select other tool types, such as tapping tools, milling tools, lathe tools, sanders, etc.

Besides using soft keys 54, the displayed data may be limited or selected in this manner from the configured selection list, using alternative input arrangements in the programming mode as well, such as via selectable menu options of a pull-down menu, a control button for a display unit or specific key combinations.

In the case of the data of the configured selection list displayed in selection window 52 and in descriptive window 53, specific fields may be chosen from a tool database, which are visually represented at this point of the NC program generation. In the illustrated example embodiment, selection window 52 includes a single field with the tool number, while further informative data pertaining to the individual tools are illustrated alongside in descriptive window 53.

Alternatively, it may be possible to display all data of the selection list to be shown for each permissible tool in one single window on the display unit. This exemplary procedure may be practical, for example, when, for an input field or an entry in the selection list, only few permissible machining data are present, and a well-arranged display of all permissible selection and descriptive data of the selection list is possible in one single window.

All descriptive data may be displayed for one entry in the selection list on one single screen side.

Figure 3:
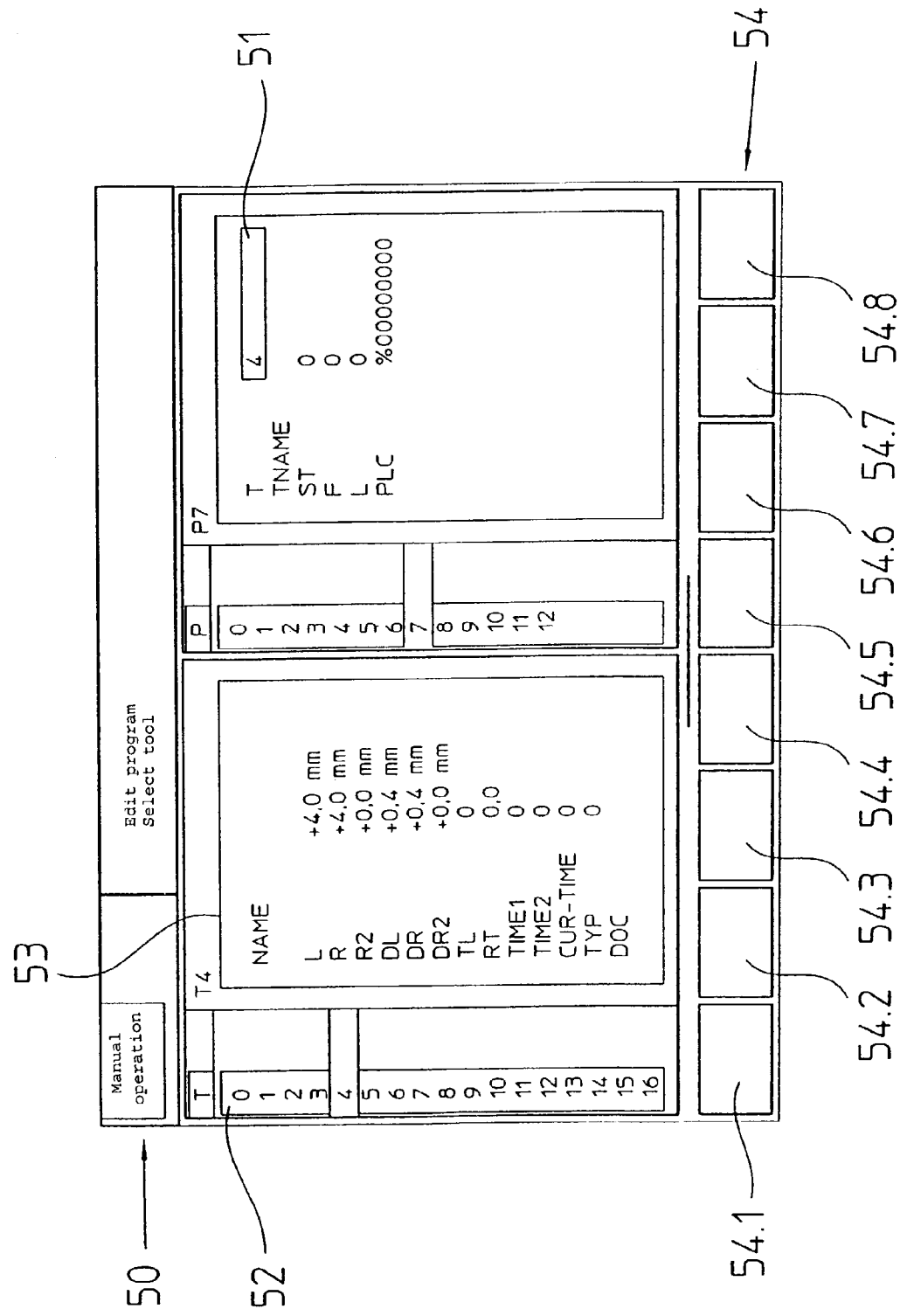
FIG. 3 is a second representation on a display unit in programming mode.

Another example, how the programmer is supported in programming mode with the aid of such configured selection lists for permissible machining data and their visual representation on the display unit, is illustrated in FIG. 3. This is mentioned as a representative example for other preparatory measures for generating NC programs or NC tables, where the measures according to the present invention may be applied. It is thus provided in accordance with FIG. 3 for the position table to be edited, where a suitable tool is assigned to specific slots of the tool magazine.

In the illustrated example, for slot P7 in an entry field 51, the exact, corresponding tool is specified. In the left part of display unit 50, in this case, a selection window 52 is displayed that includes the permissible or available tools at this point, from which the NC programmer is able to select the desired tool. In a similar manner as in the above example, for the various available tools, descriptive data for supporting the NC programmer are displayed, in turn, in a descriptive window 53.

The present invention provides, in a configuration mode, a flexible adaptation of the particular selection lists, and that they are able to be visually represented on the display unit for the various input fields, as an input aid. Thus, for instance, for the manufacturer of a machine tool, the selection lists are able to be adapted in flexible form to the particular circumstances of the machine, in order to support the NC programmer in a well-directed, i.e., machine-specific manner.

For this purpose, in the configuration mode, the selection list for an input field is configured in terms of contents via a configuration datum, the configuration datum including at least one executable selection instruction. In the actual programming mode, the selection instruction is executed such that the result is that the selection list is filled with the selected data, and the configured selection list is displayed on the display unit. For this, a selective access to at least one database containing available machining data is performed via the selection instruction. In the above example embodiment, the database which is accessed in programming mode may be a database in which the most diverse tool data are stored as machining data, organized in the form of tables. In FIG. 1, corresponding databases are indicated in schematized form by reference numerals 60 and 70.

As an executable selection instruction for configuring the contents of a suitable selection list, the configuration datum may contain at least one SQL command or an SQL statement. Via this selection instruction, in the programming mode, data are selectively read out of a database and visually represented on the display unit. An example of such an SQL command which is used, for example, to configure the selection list from the example in FIG. 2, reads, for instance, as:

"SELECT T, NAME, L R, R2, DL, DR, DR2, TL, TR, TIME1, TIME2, CURTIME, TYP, DOC FROM TOOL WHERE TYP=2 ORDER BY T"

Besides the configuration of the contents of a selection list via the selection instruction in accordance with the present invention, further properties of the selection list for an input field may also be flexibly configured in the configuration mode.

As a further property of the configured selection list, within the scope of the present invention, the display of the relevant selection list on the display unit may also be configured. Both of the examples described above concern the type and manner of the display of the selection and descriptive windows. For this purpose, in the configuration mode, at least one executable display instruction may be assigned to the configuration datum for a specific input field. With its help, the display of the data of the selection list to be displayed in programming mode on the display unit are configured, thus, for instance, in the form of a selection window and a descriptive window.

A text template or a format string for an input field in the configuration datum may be stored together with the display instruction in the configuration mode, in which the data to be displayed are inserted in programming mode.

It is then established in the example of FIG. 2, for instance, that selection window 52 on the left edge of display unit 50 displays the numbers of the tools which are permissible at this point. Of the just marked tool, specific supplementary data are displayed in descriptive window 53 placed alongside, namely the fields L, R, R2, etc., including the field identifiers and the corresponding entries in the read-out database.

In addition, in connection with the display instruction in the configuration mode, it is determined which specific field from the displayed data record is retrieved into the input field. In the above example of FIG. 2, for example, the tool number is retrieved into input field 51.

Moreover, a plurality of selection instructions may be assigned to one configuration datum in the configuration mode for one input field, which may be alternatively used to determine the data to be displayed. For example, different selection instructions may be assigned to such different tool types, so that on the display unit, following selection of a specific tool type, merely the data assigned to the particular tool type are then displayed.

In addition, in each configuration datum, for each selection instruction, a reference to an input arrangement may be stored. This may be, for example, a selectable menu option, a soft key, a key combination, a control button for a display unit, etc. Upon activation, in the programming mode, the corresponding query is executed via the selection instruction, and the corresponding selected data are displayed on the display unit. In the example embodiment illustrated in FIG. 2, it is possible, with the aid of the various soft keys, for example, to visually represent different, permissible tool types—for instance drilling tools—from the selection list on the display unit.

In the described examples, primarily tool data are stored as machining data in the various databases which are assigned to input fields. Moreover, it is possible that corresponding databases are used accordingly with other machining data, such as material data, cutting material data, or tool position data, in conjunction with the present invention.

Thus, by applying the measures according to the present invention, selection lists or input aids for input fields of an NC program are able to be generated and adapted in an individual and flexible manner.

Besides the described exemplary embodiments, a great variety of alternatives exist within the framework of the present invention.

What is claimed is:

1. A device for at least one of generating and editing one of NC programs and NC tables, comprising:
    a display unit configured to display, in a programming mode, input fields for machining data and selection lists belonging to the input fields and including permissible machining data, the display unit configured so that:
    in a configuration mode, contents of the selection list for an input field are arranged to be configured via an assigned configuration datum, the assigned configuration datum including at least one executable selection instruction; and
    in the programming mode, the selection instruction is executed such that the selection list is filled with selected data, and the configured selection list is displayed on the display unit, via the at least one selection instruction, a selective access being made to at least one database having available machining data.

2. The device according to claim 1, wherein the configuration datum includes an executable display instruction, via which a type of display of the selection list is arranged to be configured on the display unit.

3. The device according to claim 2, wherein the display unit is configured to display a selection window and a descriptive window which contain the data of the configured selection list.

4. The device according to claim 1, wherein a plurality of selection instructions are assigned to the configuration datum, the instructions configured to be alternatively used to determine data to be displayed.

5. The device according to claim 4, further comprising an arrangement configured to assign a reference of a defined input arrangement to each selection instruction for the programming mode.

6. The device according to claim 5, wherein the input arrangement includes at least one of soft keys, selectable menu options, key combinations and control buttons for display units.

7. The device according to claim 1, wherein the configuration datum includes at least one SQL command as an executable selection instruction.

8. The device according to claim 1, wherein the database includes at least one category of machining data, including tool data, material data, cutting material data and tool positioning data.

9. A method for at least one of generating and editing one of NC programs and NC tables, comprising:
    displaying on a display unit, in a programming mode, input fields for machining data and selection lists belonging to the input fields and including permissible machining data;
    configuring, in a configuration mode, contents of a selection list for an input field via an assigned configuration datum, the configuration datum including at least one executable selection instruction; and executing, in a programming mode, the selection instruction such that the selection list is filled with selected data, and the configured selection list is displayed on the display unit, via the selection instruction, a selective access is made to at least one database having available machining data.

10. The method according to claim 9, wherein the configuration datum includes an executable display instruction, via which a type of display of the selection list is configured on the display unit.

11. The method according to claim 10, further comprising displaying on the display unit a selection window and a descriptive window which contain the data of the configured selection list.

12. The method according to claim 9, further comprising assigning a plurality of selection instructions to the configuration datum, the selection instructions arranged to be alternatively used to determine the data to be displayed.

13. The method according to claim 12, further comprising assigning a reference to a defined input arrangement to each selection instruction for the programming mode.

* * * * *